United States Patent [19]

Roper

[11] Patent Number: 4,768,713
[45] Date of Patent: Sep. 6, 1988

[54] GROVE SPRAYER

[76] Inventor: Bert E. Roper, Rte. 1, Box 42-E, Winter Garden, Fla. 32787

[21] Appl. No.: 450,107

[22] Filed: Dec. 15, 1982

[51] Int. Cl.$^4$ .............................................. B05B 9/06
[52] U.S. Cl. ........................................ 239/77; 239/99
[58] Field of Search ..................... 239/77, 67, 155, 99, 239/284 A, 559, 112; 47/1, 1.43, 1.7

[56] References Cited

U.S. PATENT DOCUMENTS

| | | | |
|---|---|---|---|
| 608,540 | 8/1898 | Beler | 239/559 |
| 2,220,247 | 11/1940 | Kochendorfer et al. | 239/559 X |
| 2,746,792 | 5/1956 | Hough | 239/556 X |
| 3,093,314 | 6/1963 | Meyer | 239/425 X |
| 3,489,351 | 1/1970 | Patterson | 239/78 X |
| 3,588,893 | 6/1971 | McCloskey | 169/61 |
| 3,782,634 | 1/1974 | Herman | 239/156 |
| 3,830,014 | 8/1974 | Baker | 239/130 X |
| 3,959,924 | 6/1976 | Allen | 47/1.7 X |
| 4,202,498 | 5/1980 | Lestradet | 239/156 |
| 4,205,786 | 6/1980 | Babich et al. | 239/425 X |
| 4,206,569 | 6/1980 | Randolph | 47/1.7 |
| 4,212,428 | 7/1980 | Nabher | 239/156 X |

FOREIGN PATENT DOCUMENTS

| | | |
|---|---|---|
| 2003559 | 8/1971 | Fed. Rep. of Germany . |
| 2827659 | 1/1979 | Fed. Rep. of Germany ...... 239/156 |
| 210560 | 9/1968 | U.S.S.R. .............................. 239/77 |

Primary Examiner—Andres Kashnikow
Assistant Examiner—Kevin Patrick Weldon
Attorney, Agent, or Firm—William M. Hobby

[57] ABSTRACT

A grove sprayer includes a wheeled vehicle having at least one blower thereon blowing into a cowling for directing the air to the side of the sprayer onto the grove foliage. A plurality of spray nozzles are located in the cowling openings in position to cover a plurality of spray zones. A plurality of foliage sensors are positioned to cover a plurality of spray zones for detecting when foliage is located within each spray zone. The foliage sensors actuate each spray nozzle responsive to foliage being sensed within a spray zone, so that only those spray nozzles are actuated to spray foliage. The foliage sensors actuate the spray nozzles after a measured delay to compensate for the length of the moving vehicle. A speed sensor varies the liquid feed to the nozzles and provides a signal by which the delay is determined between the foliage sensor positions and the nozzle positions of the moving vehicle.

18 Claims, 3 Drawing Sheets

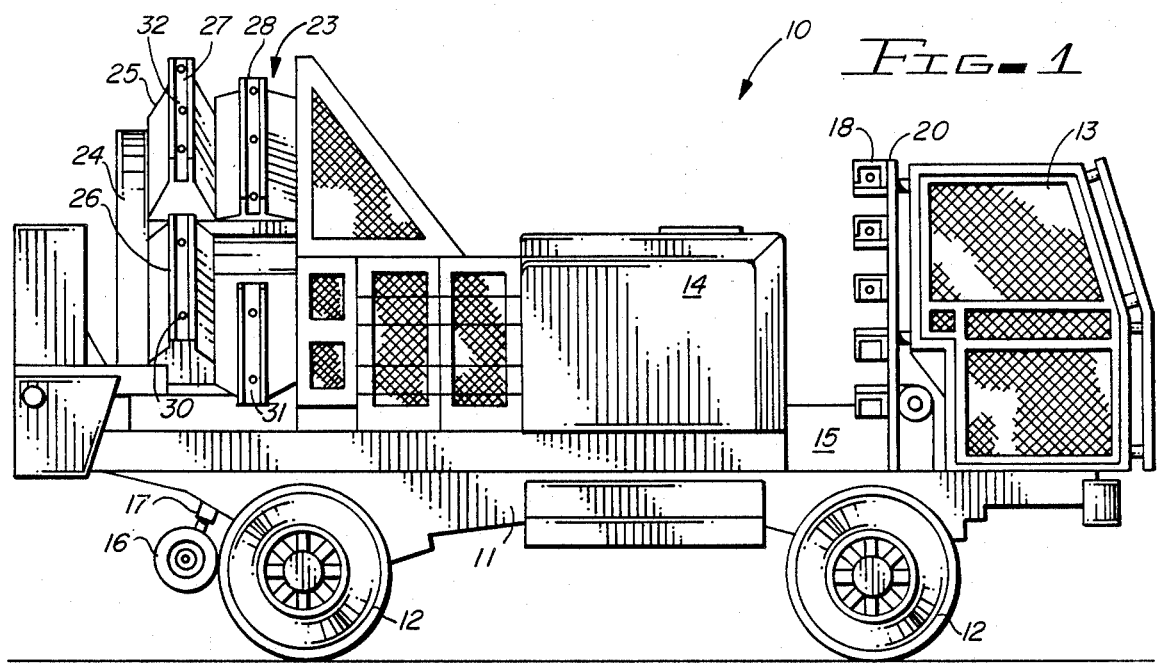
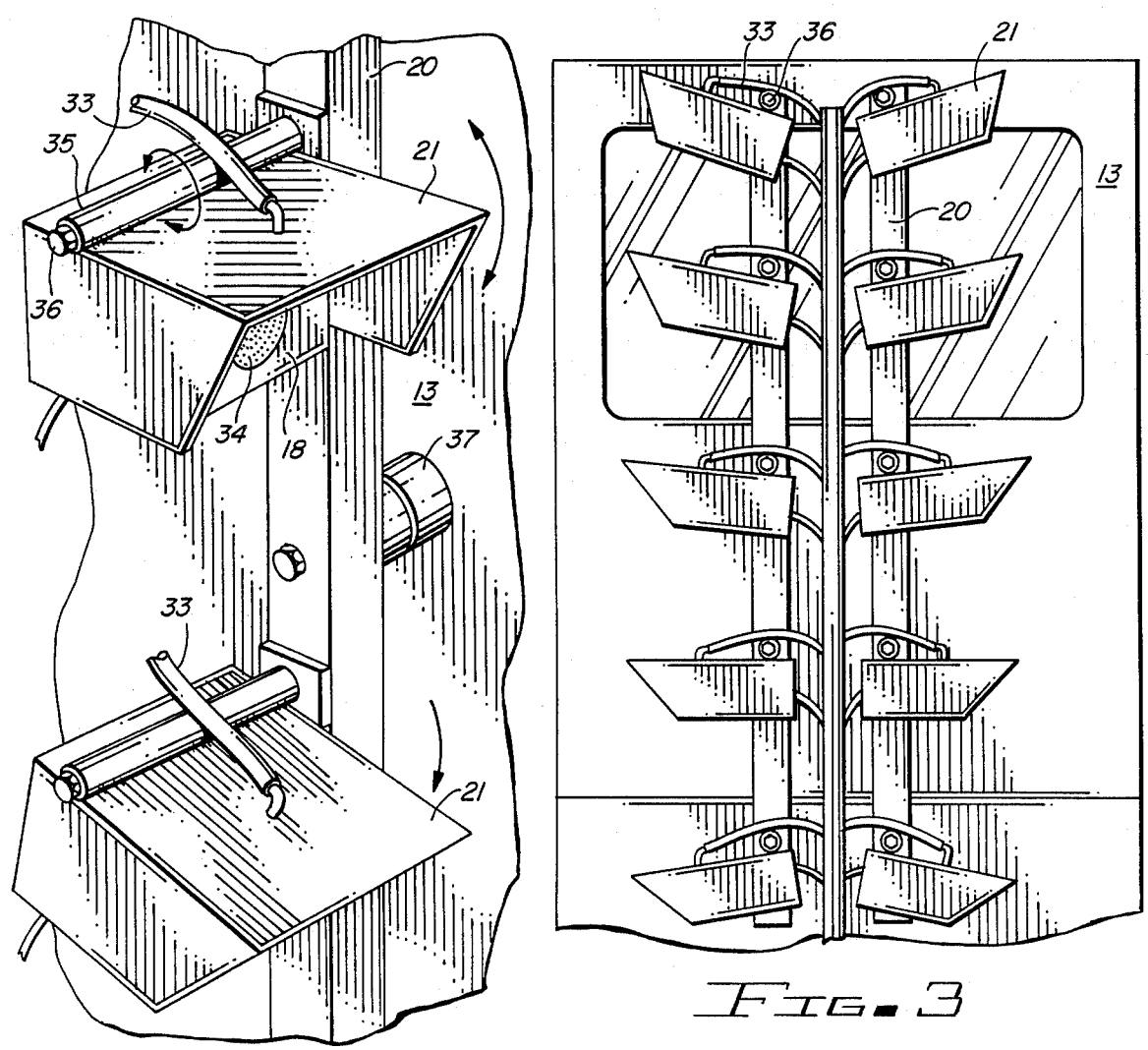
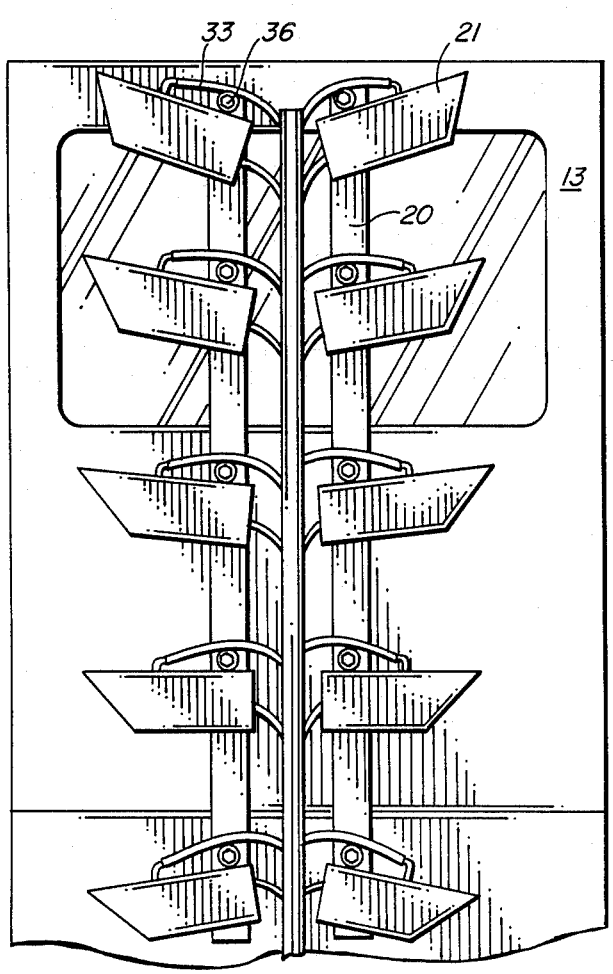

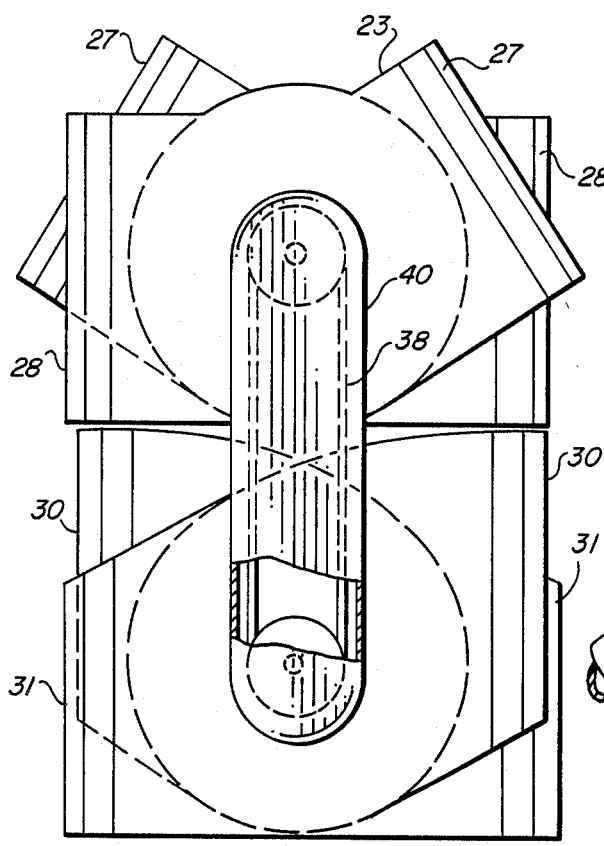
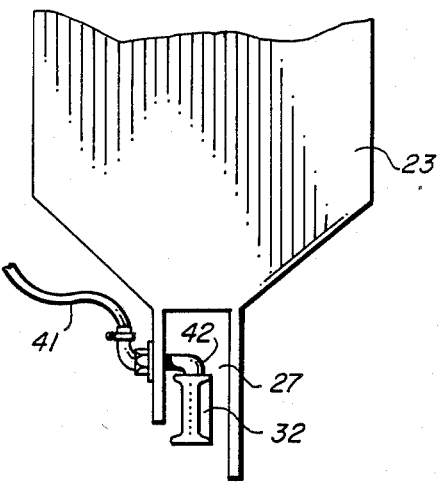
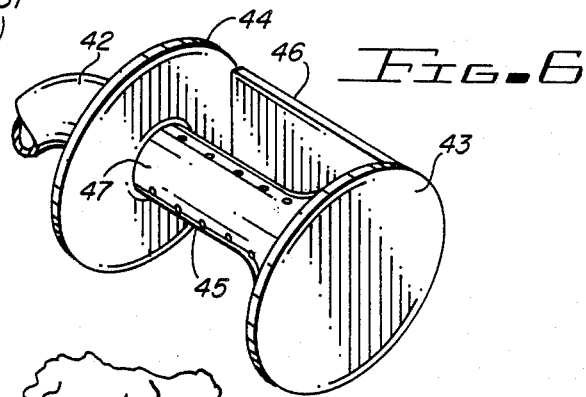
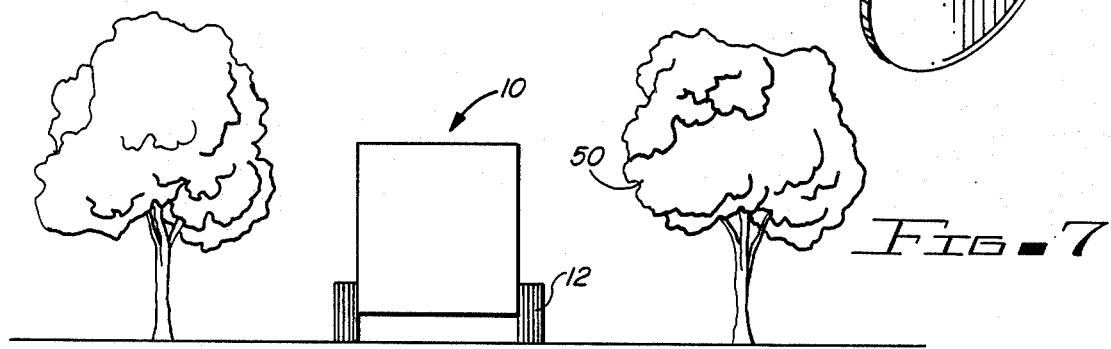
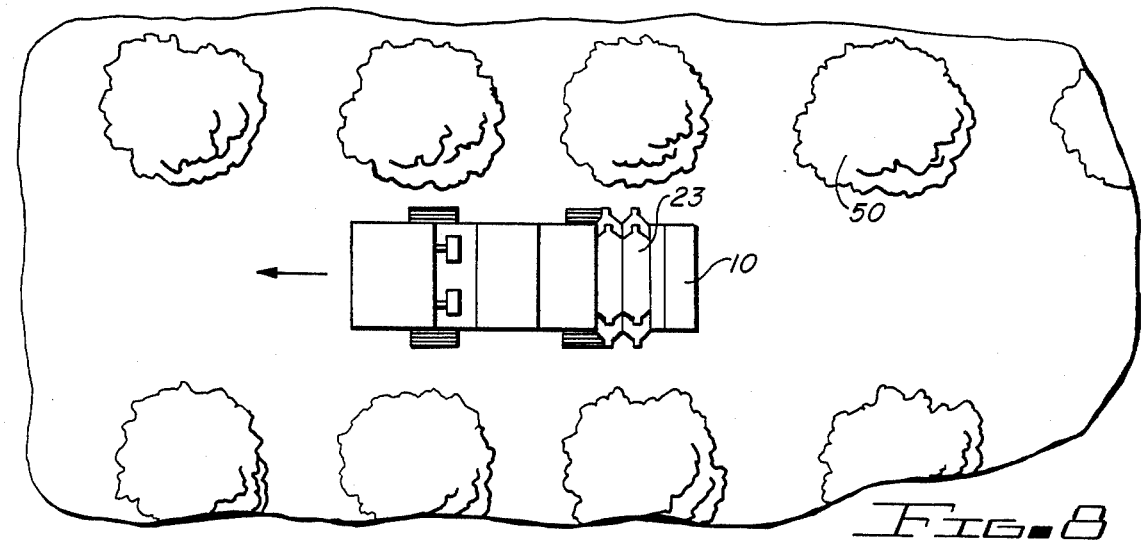

GROVE SPRAYER

BACKGROUND OF THE INVENTION

The present invention relates to grove sprayers, and especially to a grove sprayer vehicle for spraying insecticides and the like onto the foliage in a grove.

In the past, it has been common to provide a wide variety of grove sprayers and typically these are wheeled vehicles which may be motorized to provide their own power or may be articulated for attachment to the back of a motorized vehicle. As the sprayer is pulled through a grove between rows of trees, the sprayer sprays the trees on one or both sides of the row. One common type of grove sprayer uses large blowers for delivering blasts of air to the trees on either side of a row and has a spray nozzle placed in the blast of air for feeding an insecticide, fungicide, nutritional, or other sprayable liquid thereinto. The blast of air further disperses the liquid being fed by the nozzle to coat the trees. Typically, in this type of sprayer, an arc is covered on either side irrespective of the size of the trees, so that both foliage areas as well as areas between trees and under trees are commonly sprayed, thereby using considerable more of an insectide than is necessary for spraying the grove or orchard. In addition, it is typical to spray the same amount of insecticide irrespective of the speed of the vehicle, thereby varying the amount of insecticide applied to the tree in accordance with the speed of the vehicle.

To overcome the problem of the varying speed of the vehicle, some grove sprayers have suggested varying the feed of the insecticide to the spray nozzles in accordance with the speed of the vehicle. This can be accomplished by having the operating mechanism coupled to the drive shaft of the vehicle, or alternatively, a separate sensing wheel has been suggested in U.S. Pat. No. 3,489,351 for a high concentrate sprayer. It has also been suggested to use various speed sensing techniques including a radar ground speed sensory. Other prior U.S. patents of interest include U.S. Pat. Nos. 2,475,449; 2,569,274; 2,706,596; 3,252,656; 3,261,551; 3,361,357; 3,489,351; 3,490,695; 3,504,853; and 3,666,177. The present invention attempts to vary the amount of spray sprayed from each nozzle depending upon the speed of the vehicle, and actuates only those nozzles directed towards spray zones where foliage has been specifically sensed and shuts off those nozzles where foliage has not been sensed, so that large amounts of spray can be saved by not wasting insecticide liquid in spraying areas where no foliage is located or by the spraying of excessive spray when the vehicle slows down.

SUMMARY OF THE INVENTION

A grove sprayer is provided having a wheeled frame having a liquid spray tank mounted thereon and at least one blower blowing air into a cowling and out openings on either side of the cowling. A plurality of spray nozzles are positioned in the openings in the cowling to cover a plurality of spray zones. A plurality of foliage sensors are positioned on the vehicle to cover a plurality of spray zones and each being associated with one or more spray nozzles covering one or more spray zones. A control means provides for actuating only those spray nozzles responsive to a foliage sensor sensing foliage within a spray zone, so that only those areas having foliage are sprayed.

A control means includes a delay means so that each spray nozzle is positioned in the position of its foliage sensor before the control signal actuates the spray nozzle. Each foliage sensor may be ultrasonic sonar type signal which is bounced off the foliage and detected by a sound detector and may include a shield shielding each detector within the zone that the detector is aimed. A speed sensor may include a separate speed sensing wheel which determines the speed the vehicle is moving through a grove and can vary the feed to the spray nozzle responsive to the speed of the vehicle and can vary the delay between the foliage sensors and the spray nozzles in accordance with the speed and length of the vehicle. The spray nozzles can be actuated by solenoid diverter valves. The grove sprayer has a plurality of pumps for pumping the spray from the tank to the nozzles which may be driven by a hydraulic motor powered from the drive shaft.

BRIEF DESCRIPTION OF THE DRAWINGS

Other objects, features and advantages of the present invention will be apparent from the written description and the drawings, in which:

FIG. 1 is a side elevation of a grove sprayer in accordance with the present invention;

FIG. 2 is a partial perspective showing foliage sensors mounted to the vehicle of FIG. 1;

FIG. 3 is an elevation of the foliage sensor's positioned for different zones behind the cab of the vehicle of FIG. 1;

FIG. 4 is a sectional view facing the blower drives for a pair of blowers;

FIG. 5 shows a sectional view of a nozzle mounted in the air discharge opening from the blower cowling;

FIG. 6 is a perspective view of one nozzle;

FIG. 7 is an elevation of a grove sprayer passing through a grove;

FIG. 8 is a top plan view of a grove sprayer passing through a grove;

DESCRIPTION OF THE PREFERRED EMBODIMENT

Figure 9:
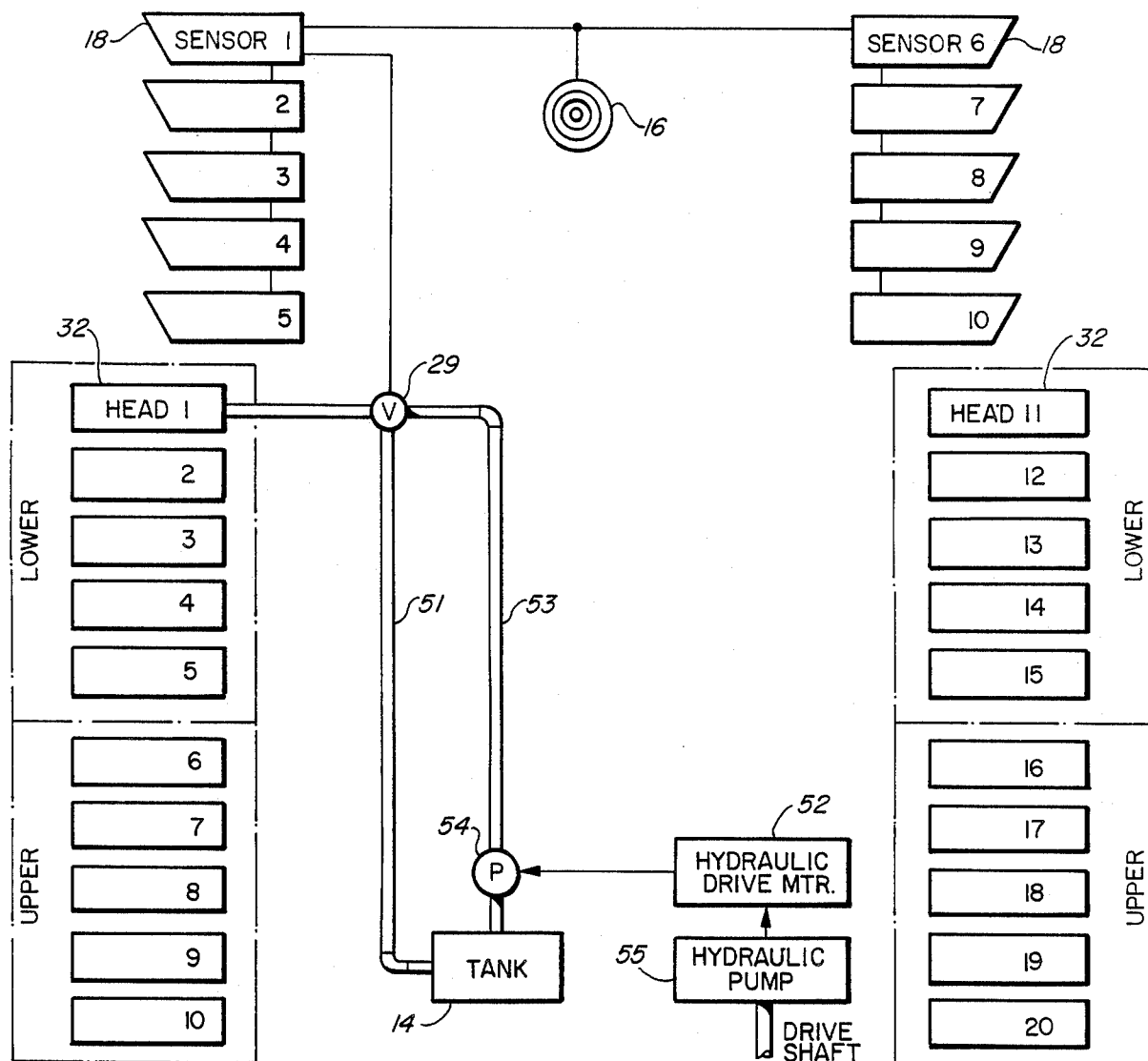
FIG. 9 is a diagrammatic view of a control system for one spray nozzle head in accordance with the present invention.

Referring to FIG. 1 of the drawings, a self propelled grove sprayer 10 has a frame 11, four wheels 12, an operator's cab 13 and a liquid spray tank 14 mounted on the frame 11. An engine 15 is mounted between the sprayer 14 and the cab 13. The grove sprayer 10 has a speed sensing wheel 16 mounted to a hydraulic ram 17, so that the wheel can be moved against the vehicle wheel 12 as desired. Normally, the wheel would be positioned to sense the speed the vehicle is moving whenever the vehicle is spraying a grove, but might be shifted when driving down a highway. A plurality of foliage sensors 18 are mounted to a frame 20 which is attached to the cab 13 and to the frame 11. Each sensor includes an ultrasonic sensor for directing a beam of ultrasonic energy towards a selected direction and sensing the reflecting ultrasonic energy reflected from foliage or other objects. A sensor has a sensor shield 21 mounted thereover for further directing the ultrasonic sound in the direction of a predetermined spraying zone and to protect the sensor from trash and accumulated dirt. An air hose 33 is connected through each shield 21 to blow trash from the sensor face. The grove sprayer 10 has a screened cage 22 to allow the entry of air into a blower cowling 23. A blower is mounted in each cowling and a drive belt 24 connects one driver blower with the other, so that the blowers are driven by one power source or an electric motor. The cowling 23 is divided into upper and lower sections 25 and 26, with each upper section 25 having an inner discharge slot 27 and 28 on each side of the sprayer 10 and each lower cowling portion 26 having lower sprayer slots 30 and 31 located on each side of the grove sprayer 10. The blowers generate air into the cowling 23 and out eight slots, four on each side with each slot on each side being spaced slightly for directing the air in slightly different directions. A plurality of spray nozzles 32 are mounted in each slot 27, 28, 30 and 31, and allows a spray liquid from the tank 14 to be sprayed into the blast of the air leaving the slots for dispersing the insecticides that is being sprayed upon the trees on either side of the grove sprayer 10. Each spray nozzle 32 is positioned in the slot to cover predetermined spray zones which have been aligned with the foliage sensors 18 which also cover predetermined spray zones, so that the foliage sensors 18 can determine which spray nozzles 32 are turned on or off so that only those areas where foliage is sensed is sprayed. A measured delay delays the turning on or off of the spray nozzles 32 until the spray nozzles have reached the approximate position that the sensors 18 sense the presence of foliage. The amount of spray can also be controlled, as well as the delay, from the speed sensor wheel 16 so that the amount of spray is evenly distributed irrespective of the speed of the vehicle.

Turning to FIGS. 2 and 3, a better view of the foliage sensors 18 is shown attached to the framework 20 and having the shields 21 thereover. Each shield 21 is connected with an air hose 33 to keep the face of the sensors clean. Each sensor 18 generates a signal responsive to a sound generator 34 generating an ultrasonic sound frequency of a highly directional nature towards the foliage and shielded from adjacent sensors by the shields 21. The ultrasonic beam is reflected off the foliage and detected by the sound detector at the ultrasonic generator 34. The sensor may be recognized as one commonly used on a popular camera for auto focusing and is used merely to sense or not to sense foliage in a space and generates an electric signal which can then be used to turn on or off a particular nozzle. Each sensor shield 21 is attached to a supporting rod 35 attached to the framework 20 and can be rotated to align the sensor 18 for the particular zone being covered by a particular spray nozzle and locked in place by tightening the bolt 36. The frame 20 is secured with mounting brackets 37 to the cab 13 of the vehicle. Thus, the sensors 18 are positioned to sense a plurality of zones on either side of the vehicle so that the vehicle recognizes any foliage that can be reached by the sprayer and directs spray only to those zones.

Figure 10:
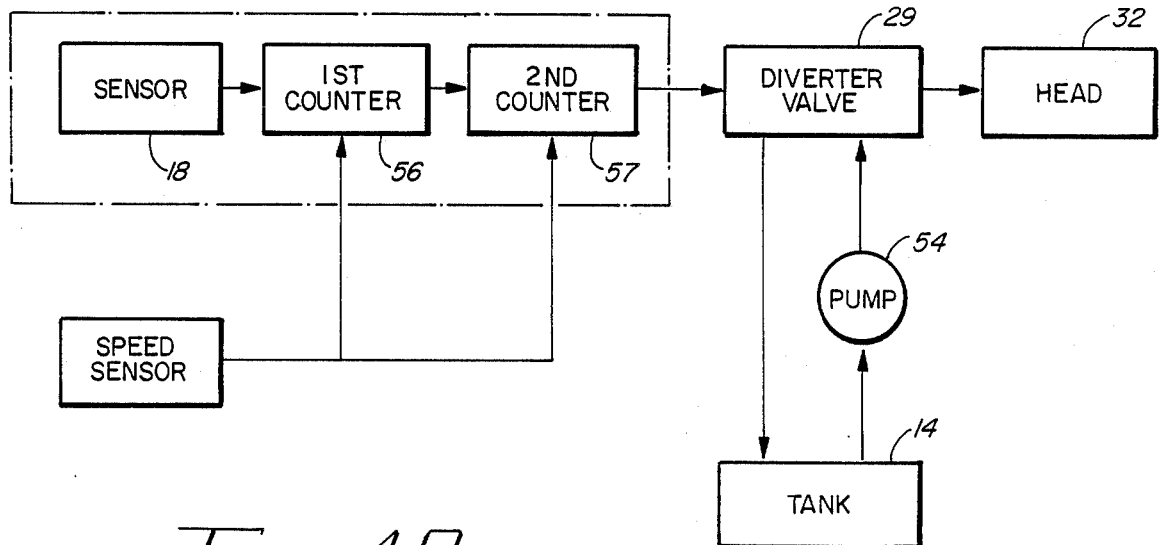
FIG. 10 is a block diagram of the control system.

FIGS. 4, 5 and 6 more clearly illustrate a grove sprayer operating mechanism and has the cowling 23 having blowers mounted therein, a gasoline or diesel engine driving one of the blowers and a connecting belt 38 covered by cover 40 connecting the upper and lower blowers. The blowers are run simultaneously at all times during the spraying operation and direct air out of the slots 27, 28, 30 and 31, each slot on each side being positioned slightly different to direct a blast of air at a different position to cover an arc from the lowest possible foliage position to the highest possible foliage position. Within each air discharge slot 27 a nozzle 32 is mounted and connected by a hose 41 to the spray and spray pump. Each nozzle 32 is supported with a bracket 42 and has a disc 43 on one end and a disc 44 on the other end with a connecting pipe between the disc 43 and 44 having the plurality of nozzle openings 45 therein for discharging the liquid spray in different positions into the blast of air passing from the cowling 23 through the air discharge slots 27. A bracket 46 connects the disc 43 and 44 to hold the disc spaced between each other with the disc 43 covering up the end of the tube 47 having the openings 45 therein. This nozzle advantageously gives a uniform distribution into the blast of the air and assists in a more complete dispersion of the discharge spray into its particular zone.

FIGS. 7 and 8 show an orchard sprayer 10 having wheels 12 and passing through a grove with trees, such as citrus trees, 50 on either side thereof. The grove sprayer 10 has the cowlings 23 directing the air therefrom to either side of the sprayer 10 onto the trees 50.

FIG. 9 shows a diagrammatic view of the operation of a grove sprayer in accordance with the present invention in which the sensors 18 are positioned in a series of ten zones, five on each side, which generate an electrical signal responsive to the ultrasonic beam sensing foliage and directs it to a diverter valve 29. Speed sensor wheel 19 is also shown signaling the speed of the vehicle into the foliage sensor 18. Each of the spray nozzles 32 is positioned on either side of the grove sprayer 10 and is connected by a separate spray pipe for delivering liquid insecticide, or the like, therethrough through a separate solenoid diverter valve 29 from a spray pipe 53 and separate spray pump 54 connected to the spray tank 14. The solenoid diverter valves 29 are actuated responsive to the sensors 18, which are associated with two spray nozzle heads for each sensor 18, so that two nozzles are actuated for each zone of spray. In addition, a delay is calculated between the sensor signals of the sensors 18 and the control casing 29, so that the spray nozzles 32 are lined up with the positions that the sensors 18 for sensing the foliage. A connection from a hydraulic drive motor 52 is connected to each pump 54 for operating each pump 54. The spray is varied in accordance with the speed sensor 16 and sensors 18 actuating the diverter valve 29 to deliver varying amounts of fluid between the heads 32 and back to the tanks 14 through line 51. This allows the pumps 54 to be run all the time and eliminate the use of clutches. A hydraulic pump 55 is driven by the drive shaft to provide power for the motor 52. In operation one pump 55 can drive one or two hydraulic drive motors driving as many as twenty pumps 54 simultaenously directing fluid from tank 14 into twenty lines 53 and through twenty diverter valves 29 to twenty heads 32 or back through twenty lines 51 to tank 14.

FIG. 10 shows a block diagram of the operation of each spray head 32. Speed sensor 16 senses the speed such as from the vehicle wheel, or by any other desired method such as a radar ground speed sensor, and directs the signal to the ultrasonic sensor 18. The ultrasonic sensor 18 container has therein first counter 56 connected in series to a second counter 57. The counters operate to form a delay which is varied according to the signal received from speed sensor 16, so that while one counter 56 may always count six counts; and the second counter may count eight counts, the delay is varied by a six count delay of count of 56 starting the second counter at one of the eight pulse counts of the counter 57; so that a varying count is very depending upon the speed sensor 16. The counter 57 produces an output which turns a diverter valve 29 from one position to direct all the fluid through the pipe 53 into the head 32 to the opposite position in which all of the fluid is directed from the pipe 53 back through the return pipe 51 to the tank 14; or anywhere in between where part of the fluid in pipe 53 is directed towards the head 32 in part through the line 51 and back to the tank 14. This system advantageously serves to keep the fluid in the tank 14 continuously stirred up. The diverter valve 29 is shown in FIG. 10 connected to the pump 54 which is always running at a speed in accordance with the hydraulic drive motor 52 to pump liquid from the tank 14 and through the diverter valve to the head 32 or back to the tank 14.

It can be seen at this time that a grove sprayer has been provided which can substantially reduce the amount of spray, such as insecticide spray, which is utilized to spray a grove at substantial savings in spray; and simultaneously reducing the amount of chemicals released into the air. It will also be clear that further embodiments and controls are contemplated as being within the spirit and scope of the invention. Accordingly, the present invention is not to be considered as limited to the forms shown, which are to be considered illustrative rather than restrictive.

I claim:

1. A grove sprayer comprising in combination:
a wheeled vehicle;
a blower having a cowling for directing air through the cowling;
a plurality of spray nozzles positioned in the flow of air from said blower and positioned to cover a plurality of spray zones;
a plurality of foliage sensors positioned to cover a plurality of spray zones, each spray zone being associated with at least one spray nozzle; and
control means for actuating spray nozzles responsive to the foliage sensors sensing foliage within a spray zone, said control means actuating said spray nozzles responsive to the foliage sensors sensing foliage within a spray zone after a predetermined delay for aligning the spray nozzles with the sensed position of the sensors whereby only those zones having foliage therein are sprayed.

2. A grove sprayer in accordance with claim 1, in which a speed sensor senses the speed of the vehicle and varies the discharge from the spray nozzles in accordance with the speed of the vehicle.

3. A grove sprayer in accordance with claim 2, in which said plurality of foliage sensors includes a plurality of ultrasonic generators directing ultrasonic energy into each of a plurality of spray zones and an acoustic sensor for sensing reflected ultrasonic sound from foliage within each zone.

4. A grove sprayer in accordance with claim 1, in which said blower has a cowling having a plurality of air discharge slots therein, at least one slot on each side of said sprayer.

5. A grove sprayer in accordance with claim 4, in which each of said plurality of said spray nozzles is mounted in one air dishcarge slot of said cowling for discharging a spray liquid into said slot having air being discharged therethrough.

6. A grove sprayer in accordance with claim 1, in which each of said plurality of foliage sensors has a sensor shield placed thereover.

7. A grove sprayer in accordance with claim 6, in which each of said plurality of foliage sensors is mounted to a frame on said vehicle and is attached to allow for adjustment of each sensor to a particular zone.

8. A grove sprayer in accordance with claim 7, in which each of said plurality of sensor shields has an air hose connected therethrough for discharging air for cleaning the face of each said sensor.

9. A grove sprayer in accordance with claim 8, in which a diverter valve is connected into the spray line for each spray nozzle and is actuated responsive to signals from said ultrasonic sensors.

10. A grove sprayer in accordance with claim 9, in which said grove sprayer has a spray tank mounted thereto for holding a supply of spray fluid.

11. A grove sprayer in accordance with claim 10, in which each spray nozzle is connected to a tank through a pump and diverter valve and has a separate return line from the diverter valve to the tank, whereby the spray nozzle output can be varied by varying the spray diverted back to the tank.

12. A grove sprayer in accordance with claim 11, in which each spray nozzle is driven by a separate pump and a hydraulic motor drives a plurality of pumps.

13. A grove sprayer in accordance with claim 12, in which said hydraulic drive motor is driven from a vehicle drive shaft, driving a hydraulic pump.

14. A grove sprayer in accordance with claim 2, in which said speed sensor includes a speed sensing wheel movable into contact with one of the vehicle wheels for measuring the speed of the vehicle by the rotation of one wheel.

15. A grove sprayer in accordance with claim 1, in which at least ten foliage sensors control at least twenty spray nozzles.

16. A grove sprayer in accordance with claim 1, in which each spray nozzle has a pipe having a plurality of discharge openings therein and having spaced disks mounted at either end of said plurality of discharge openings.

17. A grove sprayer in accordance with claim 16, in which each said discharge nozzle pair of disks are connected by a spacing bar and is positioned in said discharge opening with the disk facing into the opening.

18. A grove sprayer in accordance with claim 1, in which said blower cowling has at least four discharged slots on each side of said vehicle, each positioned to spray a different portion of foliage adjacent thereto and each having a plurality of spray nozzles mounted therein in spaced relationship to each other.

* * * * *

REEXAMINATION CERTIFICATE (2508th)
United States Patent [19]
Roper

[11] B1 4,768,713
[45] Certificate Issued Mar. 21, 1995

[54] GROVE SPRAYER

[76] Inventor: Bert E. Roper, Rte. 1, Box 42-E, Winter Garden, Fla. 32787

Reexamination Request:
No. 90/002,456, Oct. 1, 1991

Reexamination Certificate for:
Patent No.: 4,768,713
Issued: Sep. 6, 1988
Appl. No.: 450,107
Filed: Dec. 15, 1982

[51] Int. Cl.$^6$ .............................................. B05B 9/06
[52] U.S. Cl. ................................................ 239/77; 239/99
[58] Field of Search .................. 239/67, 77, 99, 155, 239/112, 559, 76; 47/1, 143, 1.7

[56] References Cited

U.S. PATENT DOCUMENTS

| | | | |
|---|---|---|---|
| 608,540 | 8/1898 | Beler | 239/559 |
| 2,220,247 | 11/1940 | Kochendorfer et al. | 158/116 |
| 2,475,449 | 7/1949 | Daugherty | 261/30 |
| 2,484,069 | 10/1949 | Boncompain | 97/135 |
| 2,569,274 | 9/1951 | Andrews | 261/30 |
| 2,706,596 | 4/1955 | Hait | 230/114 |
| 2,746,792 | 5/1956 | Hough | 299/18 |
| 3,093,314 | 6/1963 | Meyer | 239/417 |
| 3,252,656 | 5/1966 | Greenwood | 239/77 |
| 3,261,551 | 7/1966 | Funk et al. | 239/8 |
| 3,361,357 | 1/1968 | Johnston | 239/127 |
| 3,489,351 | 1/1970 | Patterson | 239/77 |
| 3,490,695 | 1/1970 | Rittenhouse | 239/77 |
| 3,504,853 | 4/1970 | Lorme | 239/77 |
| 3,588,893 | 6/1971 | Closkey | 340/418 |
| 3,609,913 | 10/1971 | Rose | 47/1.43 |
| 3,666,177 | 5/1972 | Mencacci | 239/77 |
| 3,782,634 | 1/1974 | Herman | 239/156 |
| 3,830,014 | 8/1974 | Baker | 47/1.7 |
| 3,959,924 | 6/1976 | Allen, Jr. | 47/1.43 |
| 3,977,603 | 8/1976 | Magee, Jr. | 239/76 |
| 4,202,498 | 5/1980 | Lestradet | 239/156 |
| 4,205,786 | 6/1980 | Babich et al. | 239/102 |
| 4,206,569 | 6/1980 | Randolph | 47/1.7 |
| 4,212,428 | 7/1980 | Walker | 239/677 |

FOREIGN PATENT DOCUMENTS

| | | |
|---|---|---|
| 2003559 | 8/1971 | Germany . |
| 2827659 | 1/1979 | Germany . |
| 210560 | 1/1967 | U.S.S.R. . |

OTHER PUBLICATIONS

Ladd, Jr., et al., "Photoelectrically-Operated Intermittent Sprayers for the Insecticidal Control of Horticultural Insect Pests"; J. Econ. Entom.; Aug. 1980, vol. 74, No. 4, pp. 525–528.

*Primary Examiner*—Andres Kashnikow

[57] ABSTRACT

A grove sprayer includes a wheeled vehicle having at least one blower thereon blowing into a cowling for directing the air to the side of the sprayer onto the grove foliage. A plurality of spray nozzles are located in the cowling openings in position to cover a plurality of spray zones. A plurality of foliage sensors are positioned to cover a plurality of spray zones for detecting when foliage is located within each spray zone. The foliage sensors actuate each spray nozzle responsive to foliage being sensed within a spray zone, so that only those spray nozzles are actuated to spray foliage. The foliage sensors actuate the spray nozzles after a measured delay to compensate for the length of the moving vehicle. A speed sensor varies the liquid feed to the nozzles and provides a signal by which the delay is determined between the foliage sensor positions and the nozzle positions of the moving vehicle.

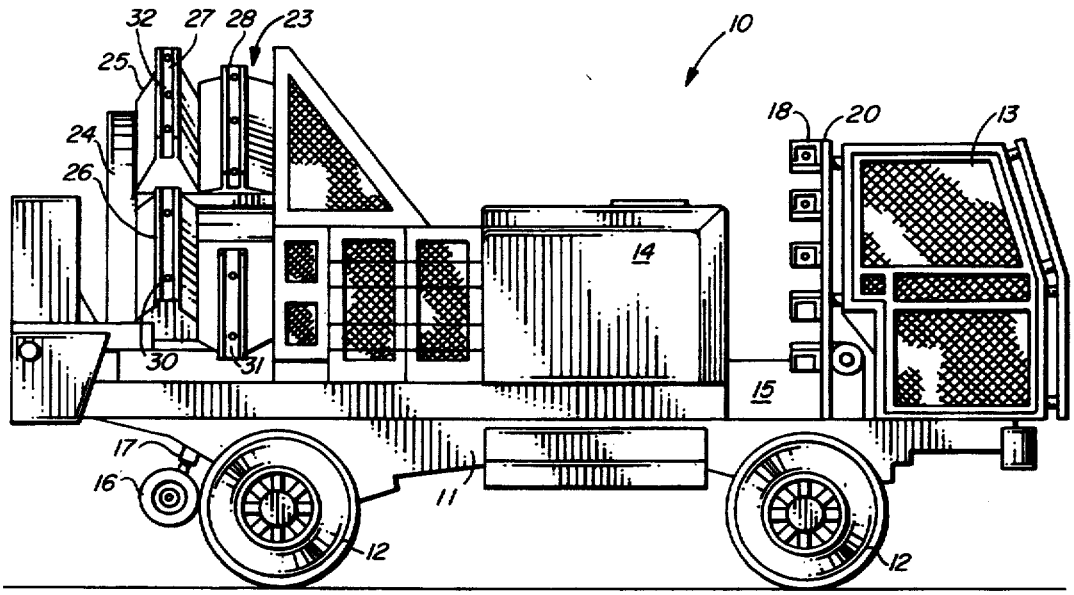

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 3, lines 57-68 and Column 4, lines 1-14:

FIGS. 4, 5 and 6 more clearly illustrate a grove sprayer operating mechanism and has the cowling 23 having blowers mounted therein, a gaseoline or diesel engine driving one of the blowers and a connecting belt 38 covered by cover 40 connecting the upper and lower blowers. The blowers are run [simulutaneously] *simultaneously* at all times during the spraying operation and direct air out of the slots 27, 28, 30 and 31, each slot on each side being positioned slightly different to direct a blast of air at a different position to cover an arc from the lowest possible foliage position to the highest possible foliage position. Within each air discharge slot 27 a nozzle 32 is mounted and connected by a hose 41 to the spray and spray pump. Each nozzle 32 is supported with a bracket 42 and has a disc 43 on one end and a disc 44 on the other end with a connecting pipe between the disc 43 and 44 having the plurality nozzle openings 45 therein for discharging the liquid spray in different positions into the blast of air passing from the cowling 23 through the air discharge slots 27. A bracket 46 connects the disc 43 and 44 to hold the disc spaced between each other with the disc 43 covering up the end of the tube 47 having the openings 45 therein. This nozzle advantageously gives uniform distribution into the blast of air and assists in a more complete dispersion of the discharge spray into its particular zone.

Column 4, lines 20-54:

FIG. 9 shows a diagrammatic view of the operation of a grove sprayer in accordance with the present invention in which the sensors 18 are positioned in a series of ten zones, five on each side, which generate an electrical signal responsive to the ultrasonic beam sensing foliage and directs it to a diverter valve 29. Speed sensor wheel [19] *16* is also shown sensing the speed of the vehicle into the foliage sensor 18. Each of the spray nozzles 32 is positioned on either side of the grove sprayer 10 and is connected by a separate spray pipe for delivering liquid insecticide, or the like, therethrough through a separate solenoid diverter valve 29 from a spray pipe 53 and separate spray pump 54 connected to the spray tank 14. The solenoid diverter valves 29 are actuated responsive to the sensors 18, which are associated with two spray nozzle heads for each sensor 18, so that two nozzles are actuated for each zone of spray. In addition, a delay is calculated between the sensor signal of the sensors 18 and the control casing 29, so that the spray nozzles 32 are lined up with the positions [that] *at which* the sensors 18 [for sensing] *sense* the foliage. A connection from a hydraulic drive motor 52 is connected to each pump 54 for operating each pump 54. The spray is varied in accordance with the speed sensor 16 and sensors 18 actuating the diverter valve 29 to deliver varying amounts of fluid between heads 32 and back to the tanks 14 through line 51. This allows the pumps 54 to be run all the time and eliminate the use of clutches. A hydraulic pump 55 is driven by the drive shaft to provide power for the motor 52. In operation one pump 55 can drive one or two hydraulic drive motors driving as many as twenty pumps [simultaenously] *simultaneously* directing fluid from tank 14 into twenty lines 53 and through twenty diverter valves 29 to twenty heads 32 or back through twenty lines 51 to tank 14.

AS A RESULT OF REEXAMINATION, IT HAS BEEN DETERMINED THAT:

Claims 2 and 13 are cancelled.

Claims 1, 3, 12, 14 and 16 are determined to be patentable as amended.

Claims 4-11, 15, 17 and 18, dependent on an amended claim, are determined to be patentable.

New claims 19, 20 and 21 are added and determined to be patentable.

1. A grove sprayer comprising in combination:
a wheeled vehicle;
*a speed sensor for sensing the speed at which said vehicle is travelling;*
a blower having a cowling for directing air through the cowling *to establish an air flow;*
[a plurality of spray nozzles] *a substantially vertical bank of spray nozzles* positioned in the flow of air from said blower and positioned to cover a plurality of spray zones, *each spray zone being associated with at least one spray nozzle and being horizontally spaced apart from said vehicle;*
a [plurality of] *substantially vertical bank of directional* foliage sensors, *said bank of foliage sensors being spaced apart from said bank of spray nozzles by a predetermined distance,* each foliage sensor being positioned to [cover] *sense foliage in* a [plurality of] *different* spray [zones, each spray zone being associated with at least one spray nozzle] *zone;* and
[control means for actuating spray nozzles responsive to the foliage sensors sensing foliage within a spray zone, said control means] *control means, coupled to said speed sensor and said foliage sensors and said spray nozzles, for simultaneously regulating the flow rate of spray fluid to said nozzles in direct proportion to the speed of said vehicle and* actuating said spray nozzles responsive to the foliage sensors sensing foliage within a spray zone after a [predetermined] *variable* time delay for aligning the spray nozzles with the sensed position of the [sensors whereby] *foliage such that* only those zones having foliage therein are sprayed, *said time delay being varied as a function of the speed of said vehicle and said predetermined distance.*

3. A grove sprayer in accordance with claim [2] *1*, in which said plurality of foliage sensors includes a plurality of ultrasonic generators directing ultrasonic energy into each of a plurality of spray zones and an acoustic sensor for sensing reflected ultrasonic sound from foliage within each zone.

12. A grover sprayer in accordance with claim [11] *1* in which each spray nozzle is [driven] *supplied* by a separate pump and a [hydraulic] motor drives a plurality of pumps *to maintain a constant discharge per spray nozzle regardless of the number of spray nozzles that are activated.*

14. A grover sprayer in accordance with claim [2] *1*, in which said speed sensor includes a speed sensing wheel movable into contact with one of the vehicle wheels for measuring the speed of the vehicle by the rotation of one wheel.

16. A grove sprayer [in accordance with claim 1, in which] *comprising in combination:*
   a wheeled vehicle;
   a blower having a cowling for directing air through the cowling;
   a plurality of spray nozzles positioned in the flow of air from said blower and positioned to cover a plurality of spray zones;
   each *of said* spray nozzles [has] *having* a pipe [having] *with* a plurality of discharge openings therein and having spaced disks mounted at either end of said plurality of discharge openings; *and*
   *a plurality of foliage sensors positioned to cover a plurality of spray zones, each spray zone being associated with at least one spray nozzle, and control means for actuating spray nozzles responsive to the foliage sensors sensing foliage within a spray zone, said control means actuating said spray nozzles responsive to the foliage sensors sensing foliage within a spray zone after a predetermined delay for aligning the spray nozzles with the sensed position of the sensors whereby only those zones having foliage therein are sprayed.*

*19. A grove sprayer in accordance with claim 1, in which said plurality of spray nozzles and said plurality of foliage sensors are positioned to cover a plurality of spray zones on a single plant.*

*20. A grove sprayer in accordance with claim 19 in which said plurality of spray zones are substantially vertically aligned.*

*21. A grove sprayer in accordance with claim 1 wherein said substantially vertical bank of spray nozzles is oriented substantially parallel with said substantially vertical bank of directional foliage sensors.*

* * * * *